United States Patent
Fan et al.

(10) Patent No.: US 10,402,483 B2
(45) Date of Patent: Sep. 3, 2019

(54) SCREENSHOT PROCESSING DEVICE AND METHOD FOR SAME

(71) Applicant: SAMSUNG ELECTRONICS CO., LTD., Suwon-si (KR)

(72) Inventors: Yang Fan, Beijing (CN); Sun Yanlong, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/914,294

(22) PCT Filed: Sep. 1, 2014

(86) PCT No.: PCT/KR2014/008157
§ 371 (c)(1),
(2) Date: Feb. 25, 2016

(87) PCT Pub. No.: WO2015/037851
PCT Pub. Date: Mar. 19, 2015

(65) Prior Publication Data
US 2016/0217114 A1 Jul. 28, 2016

(30) Foreign Application Priority Data
Sep. 12, 2013 (CN) .......................... 2013 1 0415023

(51) Int. Cl.
*G06F 3/00* (2006.01)
*G06F 17/22* (2006.01)
(Continued)

(52) U.S. Cl.
CPC .............. *G06F 17/24* (2013.01); *G06F 3/002* (2013.01); *G06F 3/04842* (2013.01);
(Continued)

(58) Field of Classification Search
CPC .. G06F 17/30554; G06F 17/24; G06F 3/0259; G06F 17/2247; G06F 9/4443;
(Continued)

(56) References Cited

U.S. PATENT DOCUMENTS

| | | | |
|---|---|---|---|
| 2007/0015118 A1* | 1/2007 | Nickell | G09B 5/02 434/118 |
| 2007/0091194 A1 | 4/2007 | Kwak | |

(Continued)

FOREIGN PATENT DOCUMENTS

| | | |
|---|---|---|
| CN | 102930263 A | 2/2013 |
| CN | 103257879 A | 8/2013 |

(Continued)

OTHER PUBLICATIONS

International Search Report and Written Opinion, issued by International Searching Authority in corresponding International Application No. PCT/KR2014/008157, dated Dec. 15, 2014. (PCT/ISA/210, PCT/ISA/220 & PCT/ISA/237).

(Continued)

*Primary Examiner* — Quoc A Tran
(74) *Attorney, Agent, or Firm* — Sughrue Mion, PLLC

(57) ABSTRACT

Disclosed is a screenshot processing method including: generating a screenshot of a displayed screen; determining at least one target area, to which a preset function is added, from a whole area of the generated screenshot; and generating a screenshot file where data for executing the preset function is combined with the screenshot.

18 Claims, 22 Drawing Sheets

(51) Int. Cl.
*G06F 17/24* (2006.01)
*G06F 9/451* (2018.01)
*H04L 12/58* (2006.01)
*G06F 16/583* (2019.01)
*G06F 3/0481* (2013.01)
*G06F 3/0484* (2013.01)
*G06F 17/00* (2019.01)

(52) U.S. Cl.
CPC ...... *G06F 16/5854* (2019.01); *G06F 17/2247* (2013.01); *G06F 3/04817* (2013.01); *G06F 9/451* (2018.02); *H04L 51/16* (2013.01)

(58) Field of Classification Search
CPC ...... G06F 3/0023; G06F 3/002; G06F 3/0482; G06F 3/04817; H04L 51/16
See application file for complete search history.

(56) References Cited

U.S. PATENT DOCUMENTS

| | | | |
|---|---|---|---|
| 2007/0245339 A1* | 10/2007 | Bauman | G06F 9/453 717/174 |
| 2008/0189648 A1 | 8/2008 | Anglin et al. | |
| 2009/0031227 A1* | 1/2009 | Chakrabarti | G06F 9/4443 715/763 |
| 2010/0070842 A1* | 3/2010 | Aymeloglu | G06F 17/2288 715/207 |
| 2011/0047488 A1* | 2/2011 | Butin | G06F 3/04842 715/762 |
| 2011/0248992 A1* | 10/2011 | van Os | G06T 11/60 345/419 |
| 2012/0046071 A1 | 2/2012 | Brandis et al. | |
| 2012/0072833 A1* | 3/2012 | Song | G06F 17/212 715/243 |
| 2012/0185066 A1* | 7/2012 | Kern | G06F 17/30259 700/91 |
| 2013/0104032 A1 | 4/2013 | Lee et al. | |
| 2013/0227457 A1 | 8/2013 | Kim et al. | |
| 2014/0075371 A1* | 3/2014 | Carmi | G06F 11/3438 715/781 |

FOREIGN PATENT DOCUMENTS

| | | |
|---|---|---|
| KR | 10-0736076 B1 | 7/2007 |
| KR | 10-2010-0002531 A | 1/2010 |
| KR | 10-2010-0022344 A | 3/2010 |
| KR | 10-1056471 B1 | 8/2011 |
| KR | 10-2013-0042702 A | 4/2013 |
| KR | 10-2013-0097622 A | 9/2013 |

OTHER PUBLICATIONS

Communication dated Feb. 1, 2017, issued by the European Patent Office in counterpart European Patent Application No. 14844885.5.
Communication dated Apr. 6, 2017, issued by the State Intellectual Property Office of the People's Republic of China in counterpart Chinese Patent Application No. 201310415023.4.
Communication dated Apr. 20, 2017, issued by the European Patent Office in counterpart European Patent Application No. 14844885.5.
Communication dated Sep. 5, 2017 by the European Patent Office in counterpart European Patent Application No. 14844885.5.
Communication dated Oct. 20, 2017 by the State Intellectual Property Office of P.R. China in counterpart Chinese Patent Application No. 201310415023.4.
Communication dated Aug. 3, 2018, issued by the State Intellectual Property Office of P.R. China in counterpart Chinese Application No. 201310415023.4.
Communication dated Apr. 10, 2018, issued by the European Patent Office in counterpart European Patent Application No. 14844885.5.
Communication dated Apr. 20, 2018, issued by the State Intellectual Property Office of the People's Republic of China in counterpart Chinese Patent Application No. 201310415023.4.
Communication dated Mar. 27, 2019, issued by the State Intellectual Property Office of People's Republic of China in counterpart Chinese Application No. 201310415023.4.

* cited by examiner

TEXT STRING

SCREENSHOT PROCESSING DEVICE AND METHOD FOR SAME

TECHNICAL FIELD

The present invention relates to a screenshot processing method and apparatus.

BACKGROUND ART

A screenshot function is a function that is generally provided in a computer and a mobile device. Some mobile devices provide functions of changing styles of screenshots or editing screenshots such as capturing part of a screenshot or the like.

However, an editing function includes only relatively simple functions and thus does not satisfy various higher-order needs of a user. In particular, a main purpose of a user who generates a screenshot in a mobile device is to store part of the screenshot, share the screenshot with a third person, or select part of the screenshot to execute a particular function. In this case, various higher-order needs of the user are not satisfied.

DETAILED DESCRIPTION OF THE INVENTION

Technical Problem

Exemplary embodiments of the present invention provide adding of a preset function to a screenshot to improve a usability of the screenshot.

Technical Solution

According to an aspect of the present invention, there is provided a screenshot processing method including: generating a screenshot of a displayed screen; determining at least one target area, to which a preset function is added, from a whole area of the generated screenshot; and generating a screenshot file where data for executing the preset function is combined with the screenshot.

The generating of the screenshot may include: storing at least one view node configuring the displayed screen and information about the at least one view node; and capturing the displayed screen.

The information about the at least one view node may include at least one selected from an ID (Identification), a name, coordinates, and a size of the at least one view node.

The at least one target area may be manually determined through a user input or may be automatically determined through a preset format.

The data for executing the preset function may be acquired from an external device or a local device.

The data for executing the preset function may be replaced with URL (uniform resource locator) data of an external device that stores the data for executing the preset function.

The screenshot processing method may further include: sharing the screenshot file with an external device.

The screenshot processing method may further include: displaying the generated screenshot file; identifying an area selected by a user from a whole area of the displayed screenshot file; decoding the screenshot file; and executing a function added to the area selected by the user.

The decoding of the screenshot file may include: acquiring display information of a device where the added function is to be executed; and adjusting the screenshot and the data for executing the preset function based on the acquired display information.

The decoding of the screenshot file may include acquiring information stored in an external device based on the data for executing the preset function. The data for executing the preset function may be data replaced with URL data of the external device, and the function added to the area selected by the user may be executed by using the information stored in the external device.

According to another aspect of the present invention, there is provided a screenshot processing device including: a user interface which receives a screenshot request; and a processor which generates a screenshot of a displayed screen, determines at least one target area, to which a preset function is added, from a whole area of the generated screenshot, and generates a screenshot file where data for executing the preset function is combined with the screenshot.

The processor may store at least one view node configuring the displayed screen and information about the at least one view node and capture the displayed screen.

The information about the at least one view node may include at least one selected from information about an ID (Identification), a name, coordinates, and sizes of the at least one view node.

The processor may manually determine the at least one target area through a user input or may automatically determine the at least one target area through a preset format.

The data for executing the preset function may be acquired from an external device or a local device.

The data for executing the preset function may be replaced with URL (uniform resource locator) data of an external device storing the data for executing the preset function.

The processor may share the screenshot with an external device.

The device may further include a display which displays the generated screenshot file. The processor may identify an area selected by a user from a whole area of the displayed screenshot file, decode the screenshot file, and execute a function added to the area selected by the user.

The processor may acquire display information of a device where the added function is to be executed to adjust the screenshot and the data for executing the preset function based on the acquired display information.

The processor may acquire information stored in an external device based on the data for executing the preset function. The data for executing the preset function may be data replaced with URL data of the external device, and the function added to the area selected by the user may be executed by using the information stored in the external device.

Advantageous Effects of the Invention

Screenshot users may store some of screenshots, share the screenshots with a third person, or select some of the screenshots to execute a particular function.

BEST MODE

Figure 1:
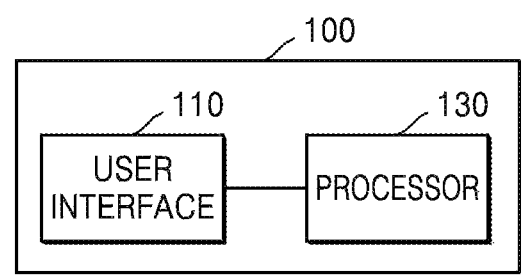
FIG. 1 is a block diagram of a screenshot processing device according to an exemplary embodiment of the present invention.

Provided is a method of processing a screenshot, including: generating a screenshot of a displayed screen; determining at least one target area, to which a preset function is added, from a whole area of the screenshot; and combining data for executing the preset function with the screenshot to generate a screenshot file.

MODE OF THE INVENTION

Reference will now be made in detail to exemplary embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects.

The terms used herein will be described in brief, and the example embodiments will be described in detail.

The terms used herein are general terms that are currently widely used in consideration of functions in the example embodiments but may vary according to intentions of those of ordinary skill in the art, precedents, appearances of new technologies, or the like. Also, the applicant may arbitrarily select terms in a particular case, and meanings of the terms corresponding to this case will be described in detail in the description of the present invention. Therefore, the terms used herein may be defined based on meanings thereof and the overall contents of the example embodiments not based on names of simple terms.

When a part "comprises" an element in the specification, this may mean that the part may not exclude and may further include other elements as long as there is no contrary description. The term "unit" used herein refers to a hardware element such as FPGA or ASIC and performs any role. However, the term "unit" is not limited to software or hardware. The "unit" may be constituted to be in a storage medium that may be addressed or may be constituted to play one or more processors. Therefore, for example, the "unit" includes elements, such as software elements, object-oriented elements, class elements, and task elements, processes, functions, attributes, procedures, sub routines, segments of a program code, drivers, firmware, a microcode, a circuit, data, a database (DB), data structures, tables, arrays, and parameters. Functions provided in elements and "units" may be combined as the smaller number of elements and "units" or may be separated as additional elements and "units".

In the present specification, a "screenshot" refers to a screen display content that is stored as a graphic file or copied into a text editor or a graphic editor. For example, the screenshot may be generated by a Print Screen key in a window platform.

Also, a "screenshot file" refers to a file that is generated by combining additional information with the screenshot. For example, the screenshot may be combined with a particular image to generate the screenshot file. Here, a process of combining the additional information with the screenshot is referred to as an "encoding" process.

A "mobile device" used herein refers to portable computing devices including a portable phone, a smartphone, a tablet PC, a laptop PC, a portable multimedia player (PMP), a personal digital assistant (PDA), etc.

Hereinafter, example embodiments of the present invention will be described in detail with reference to the attached drawings, so that those of ordinary skill in the art easily embodies the example embodiments. Also, parts unrelated to descriptions are omitted to clearly describe the present invention in the drawings.

FIG. 1 is a block diagram of a screenshot processing device according to an exemplary embodiment of the present invention.

The screenshot processing device 100 according to the present exemplary embodiment may include a user interface 110 and a processor 130. The user interface 110 receives a screenshot request. The processor 130 generates a screenshot of a displayed screen, determines at least one target area, to which a preset function is to be applied, from a whole area of the generate screenshot, and combines the screenshot with data executing the preset function to generate one screenshot file.

To make the screenshot request, a user may sweep a screen of a mobile device with a palm, click a screenshot button on the screen, input a voice command for requesting a screenshot, recognize light irradiated onto a light sensor of the screenshot processing device 100, or click a physical button of the screenshot processing device 100. However, the screenshot request is not limited to operations described above but may enable various types of operations.

The user interface 110 may receive various types of screenshot requests.

The processor 130 may exist in a mobile device such as a laptop PC, a PDA, a portable phone, or the like but may exist outside independently of the laptop PC or the mobile device.

The processor 130 may include a screenshot generator, a target area determiner, an encoder, a storage, and a communication interface.

According to example embodiments, the processor 130 may further include a file identifier, a decoder, a user manipulation identifier, and a data analysis processor.

The screenshot processing device 100 according to the present exemplary embodiment may further include a display that displays a screenshot and a preset function, besides the user interface 110 and the processor 130. In this case, the processor 130 may further include a function of identifying an area selected by the user from a whole area of a displayed screenshot file, decoding the identified area, and executing an added function in the identified area.

Figure 2:
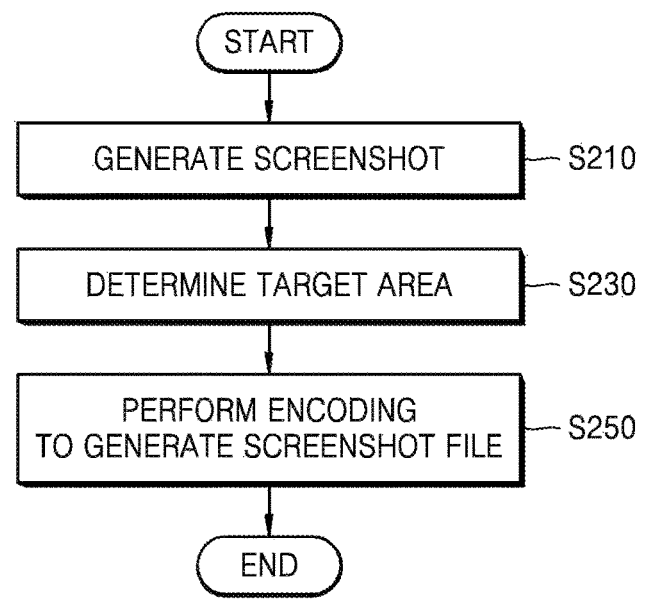
FIG. 2 is a flowchart of generation of a screenshot file according to an exemplary embodiment of the present invention.

FIG. 2 is a flowchart of a generation of a screenshot file according to an exemplary embodiment of the present invention.

In operation S210, the screenshot processing device 100 generates a screenshot of a displayed screen.

According to example embodiments, when generating a screenshot, the screenshot processing device 100 may store at least one view node configuring the displayed screen and information about an ID, a name, coordinates, a size, etc. of the view node together.

According to example embodiments, when generating the screenshot, the screenshot processing device 100 may also determine a selectable area that may be determined as a target area by the user.

In operation S230, the screenshot processing device 100 may determine at least one target area, to which a preset function is to be added, from the selectable area of the generated screenshot.

In example embodiments, a user input for the displayed screenshot may be identified to determine the target area.

According to example embodiments, the target area may be automatically determined according to a preset format.

In operation S250, the device 100 may combine the screenshot with data for executing the preset function, which will be added into the target area determined by the user, to generate one screenshot file.

In example embodiments, the preset function, which is to be added to the target area, may be an execution of a text editor, playing of an image, loading of a file existing in an external device, a display of an image, an execution of a particular application, or the like.

Figure 3:
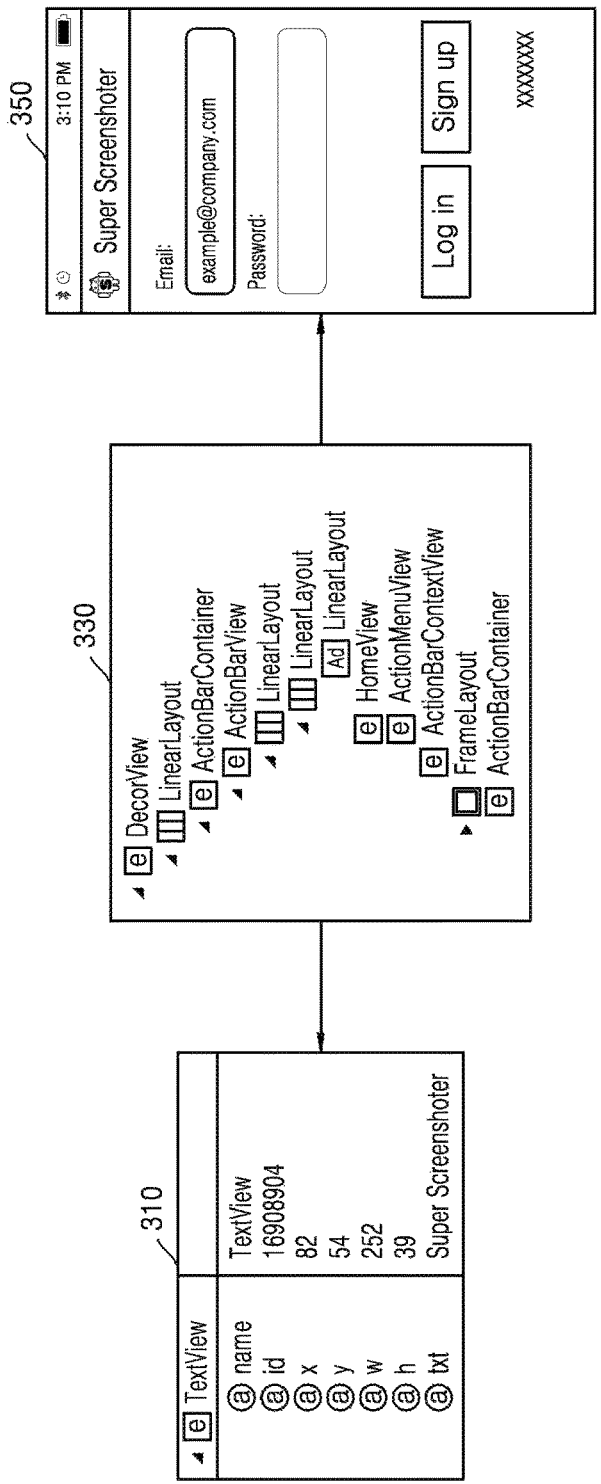
FIG. 3 illustrates an Android screen and a view tree according to an exemplary embodiment of the present invention.

FIG. 3 illustrates an Android screen and a view tree according to an exemplary embodiment of the present invention.

In general, when a new activity starts, a mobile device including an Android platform may generate a new window for the activity, register the generated window in a window manager service, and store a view hierarchy for each window screen.

Here, the "activity" is a term indicating one screen in Android, and views refer to UI components of the activity. In other words, a view is an element of a screen seen with eyes of the user, and a button, a text field, a checkbox, or the like corresponds to a view.

An element including several views described above is referred to as a "view group". An example of the view group is a layout, and the layout refers to a kind of view container disposing an element of a screen, i.e., a view on the screen. Android provides a linear layout, a table layout, a grid layout, or the like.

The view group is different from a view, but if the view group inherits an attribute of the view, the view group may be treated as a kind of view.

An android window screen 350 may be formed in an XML view tree 330, and if attributes of view nodes configuring the XML view tree 330 are analyzed, information 310 about a screen area interested by the user may be acquired.

Figure 4:
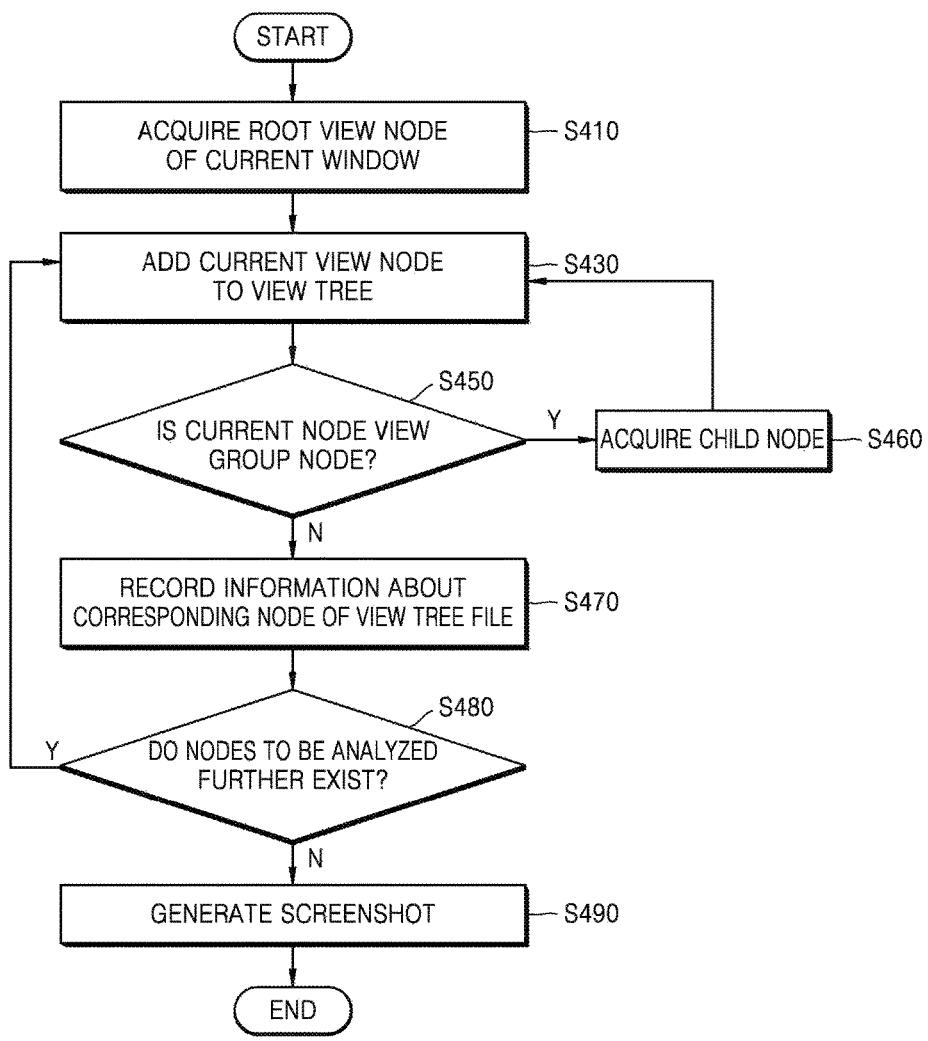
FIG. 4 is a flowchart of a process of generating a screenshot according to an exemplary embodiment of the present invention.

FIG. 4 is a flowchart of a process of generating a screenshot according to an exemplary embodiment of the present invention.

In operation S410, the device 100 may acquire a RootView node of a current window screen. The RootView node refers to a node that is a start point of a view tree. Therefore, the acquiring of the RootView node refers to acquiring of a start point at which the view tree will be generated.

In operation S430, the screenshot processing device 100 may add a current View node to the view tree. Each of view nodes seen on the view tree 330 of FIG. 3 may be the current View node.

In operation S450, the screenshot processing device 100 checks whether the current View node is one of ViewGroup nodes. If the current View node is the ViewGroup node, the screenshot processing device 100 determines a child node of the current View node as the current View node in operation S460 to re-perform operation S430.

If the current View node is not one of the ViewGroup nodes, information about a node ID, a name, coordinates, a size, etc. of the corresponding node may be recorded in operation S470. In operation S480, whether a node to be analyzed further exists on a current screen besides the current View node is checked. If the node to be analyzed does not exist, a displayed screen is captured to generate a screenshot in operation S490. If the node to be analyzed further exits, a node to be next analyzed is determined as the current View node to re-perform operation S430.

Figure 5:
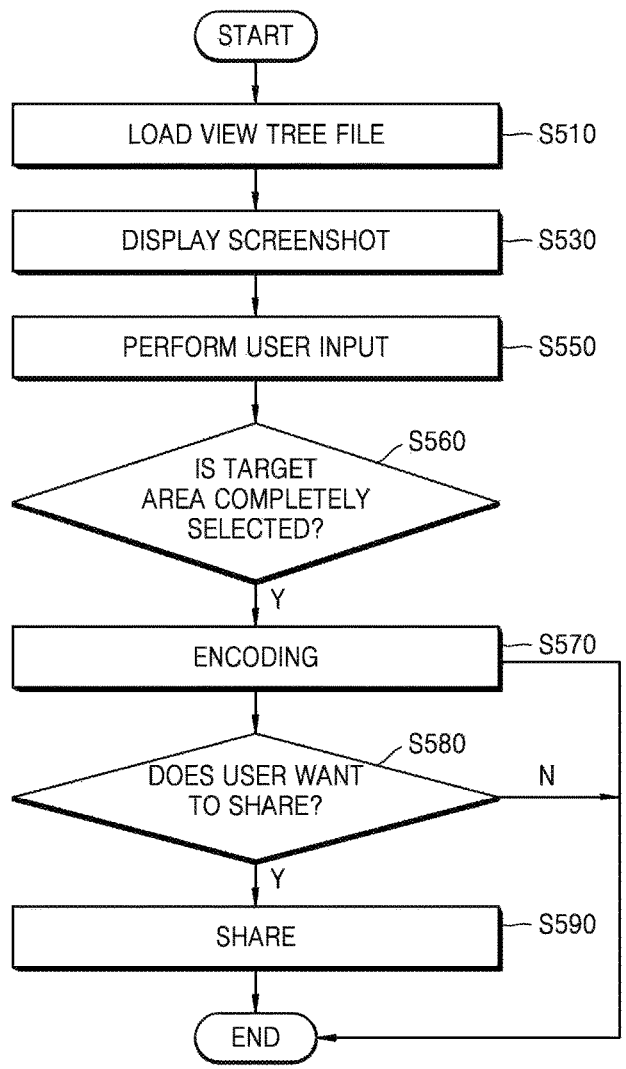
FIG. 5 is a flowchart of a process of determining a target area in a generated screenshot according to an exemplary embodiment of the present invention.

FIG. 5 is a flowchart of a process of determining a target area in a generated screenshot, according to an exemplary embodiment of the present invention.

In operation S510, the screenshot processing device 100 loads a view tree file.

In operation S530, the screenshot processing device 100 displays a screenshot.

In operation S550, the device screenshot processing 100 receives a user input. The user input may be performed to perform various types of touches on the displayed screenshot.

In operation S560, the screenshot processing device 100 checks an area selected by a user from a whole area of the displayed screenshot through the user input. In example embodiments, an area selection of the user may be performed in a view node unit of a view tree file stored in the corresponding screenshot.

The area selected by the user may be a target area to which a preset function is to be added.

If the target area is selected, the screenshot processing device 100 performs an encoding job of combining the screenshot with data executing the preset function that is to be added to the selected target area in operation S570. If the target area is not selected, the screenshot processing device 100 checks whether the user wants to share the screenshot in operation S580. If the user wants to share the screenshot, the user shares the screenshot with a third person in operation S590. The screenshot may be uploaded to a server through a network to perform the sharing of the screenshot with the third person or the sharing of the screenshot with the third person may be directly performed through wire and wireless networks.

Figure 6:
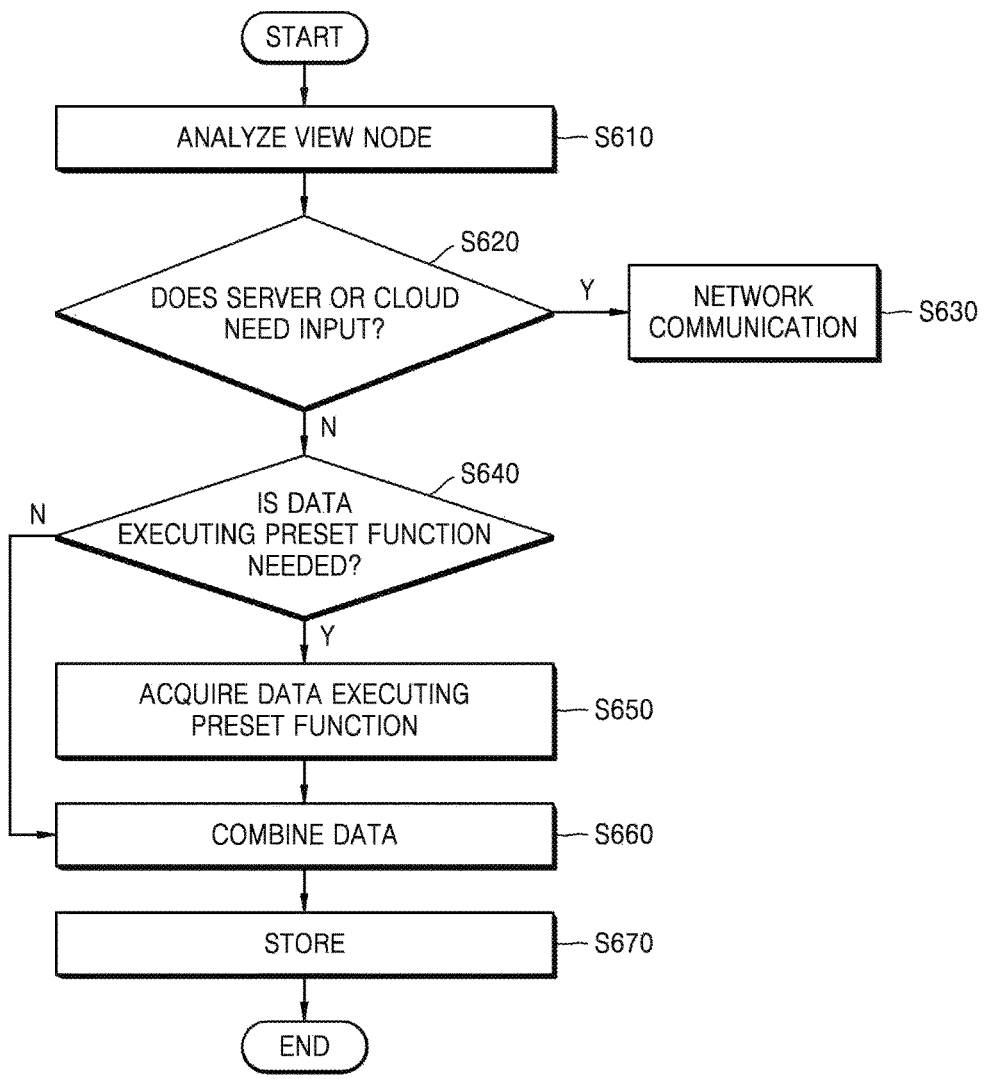
FIG. 6 is a flowchart of a process of adding a function to a determined target area to encode the function, according to an exemplary embodiment of the present invention.

FIG. 6 is a flowchart of a process of adding a function to a determined target area to perform encoding, according to an exemplary embodiment of the present invention.

In operation S610, the screenshot processing device 100 may analyze a view node of a target area. A node ID, a name, coordinates, a size, etc. stored in the view node of the target area when generating the screenshot may be used to analyze the view node.

In operation S620, the screenshot processing device 100 determines whether a server or a cloud input is necessary.

If data executing a preset function to be added to a target area has a large capacity, the screenshot processing device 100 stores the corresponding data in a server or the cloud. URL data of a storage area is received to replace the data executing the preset function with the received URL data. The replaced URL data is encoded along with the screenshot.

Even if the data executing the preset function to be added to the target area is stored in an external device, the screenshot processing device 100 receives location information data of the external device storing the corresponding information and replaces the data with the location information data receiving the data executing the preset function. Also, the replaced location information data may be encoded along with the screenshot.

If the data executing the preset function to be added to the target area is stored in the server or the cloud, the URL data of the storage area is received, and the received URL data is combined with the screenshot to generate a screenshot file, the screenshot processing device 100 determines that a server or cloud input is necessary. If it is determined that the server or cloud input is necessary, the screenshot processing device 100 may communicate with the server or the cloud through a network in operation S630.

If it is determined that the server or cloud input is not necessary, the screenshot processing device 100 determines whether the data executing the preset function to be added to the target area is necessary, in operation S640.

If it is determined that the data executing the preset function to be added to the target area is necessary, the screenshot processing device 100 may acquire the data executing the preset function to be added to the target area in operation S650. For example, the screenshot processing device 100 may acquire the data executing the preset function to be added to the target area through a content provider.

In operation S660, the screenshot processing device 100 combines the screenshot with the data executing the preset function. One screenshot file is generated according to the combination result.

In operation S670, the screenshot processing device 100 may store the generated screenshot file in a storage. In example embodiments, a storage may be excluded, and in other example embodiments, the storage function may be stored in a server through a network to be shared with other users.

Figure 7:
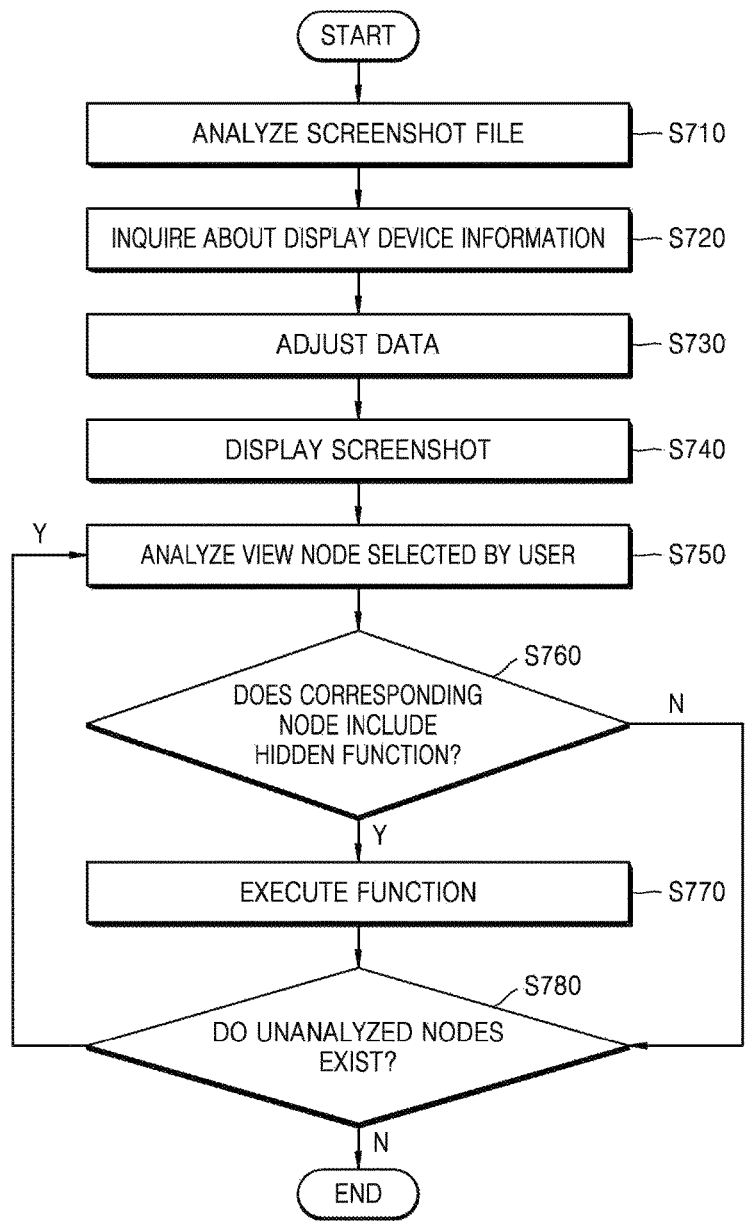
FIG. 7 is a flowchart of a process of performing decoding to execute a preset function in a selected area when executing a generated screenshot file, according to an exemplary embodiment of the present invention.

FIG. 7 is a flowchart of a process of performing decoding to execute a preset function in a selected area when executing a generated screenshot file, according to an exemplary embodiment of the present invention.

In operation S710, the screenshot processing device 100 analyzes a screenshot file. The screenshot file may be a file where the screenshot and data executing a preset function to be added to some areas of the screenshot are encoded together.

In operation S720, the screenshot processing device 100 may display the screenshot and inquires of a target device about display information, wherein the added function is to be executed in the target device. The display information may include a size and a resolution of a screen. The target device may be the same device as the screenshot processing device 100 of the present invention or may be a different device from the screenshot processing device 100 of the present invention.

In operation S730, the screenshot processing device 100 may adjust the screenshot and the data executing the preset function according to the display information acquired in operation S720. The data may be optimized in the target device through the adjustment.

In operation s740, the screenshot processing device 100 may display the screenshot in the target device. When displaying the screenshot, the screenshot processing device 100 may highlight and display the target area to which the preset function is added.

In operation S750, the screenshot processing device 100 may analyze information about a view node corresponding to an area selected from a whole area of the screenshot by a user.

In example embodiments, the user may select at least one target area according to a method of clicking a selectable area of a whole area of a screenshot or the like.

In operation S760, the screenshot processing device 100 may determine whether a view node corresponding to the target area selected by the user includes a hidden function.

If the view node selected by the user includes the hidden function, the screenshot processing device 100 may execute the hidden function included in the corresponding view node in operation S770. For example, an execution of a text user interface, image playing, loading of an installation file, an execution of an application, or the like may correspond to the hidden function.

In example embodiments, the hidden function may acquire and execute information stored in the external device based on the data executing the preset function. Here, the data executing the preset function may be data replaced with the URL data of the external device, and a function added to the area selected by the user may be executed by the information stored in the external device.

In operation S780, the screenshot processing device 100 checks whether an unanalyzed node exists. If the unanalyzed node exists, the screenshot processing device 100 may re-perform operation S750.

Figure 8:
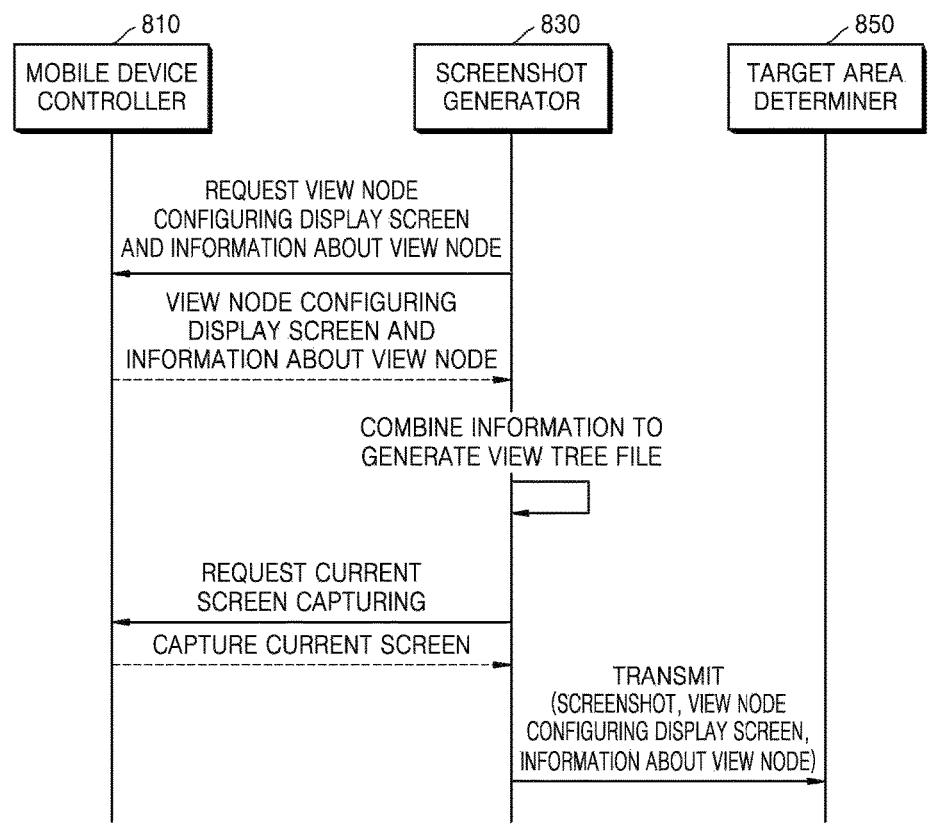
FIG. 8 is a schematic view of an information flow of a screenshot processing device based on a screenshot generator, according to an exemplary embodiment of the present invention.

FIG. 8 is a schematic view of an information flow of the screenshot processing device 100 based on a screenshot generator, according to an exemplary embodiment of the present invention.

A screenshot generator 830 may request at least one view node configuring a displayed screen and information about the view node from a mobile device controller 810. The information about the view node may include information about a node ID, a name, a size, coordinates, etc. of each node configuring a view tree of the displayed screen.

The mobile device controller 810 may provide the screenshot generator 830 with at least one view node configuring a current display screen and information about each view node.

The screenshot generator 830 combines the view node acquired by the mobile device generator 810 and information about each view node to generate a view tree file.

The screenshot generator 830 may request capturing of a current screen from the mobile device controller 810. The mobile device controller 810 may capture a current screen and transmit the captured current screen to the screenshot generator 830.

The screenshot generator 830 transmits the screenshot of the displayed screen, at least one view node configuring the displayed screen, and information about the view node to a target area determiner 850.

The screenshot generator 830 may be an independent element of the processor 130 of the screenshot processing device 100 or may correspond to some functions of the processor 130 not the independent element.

The screenshot processing device 100 may be an independent device that exists separately from the mobile device 810.

In other example embodiments, the screenshot processing device 100 may be one hardware device that is combined with the mobile terminal 810.

Figure 9:
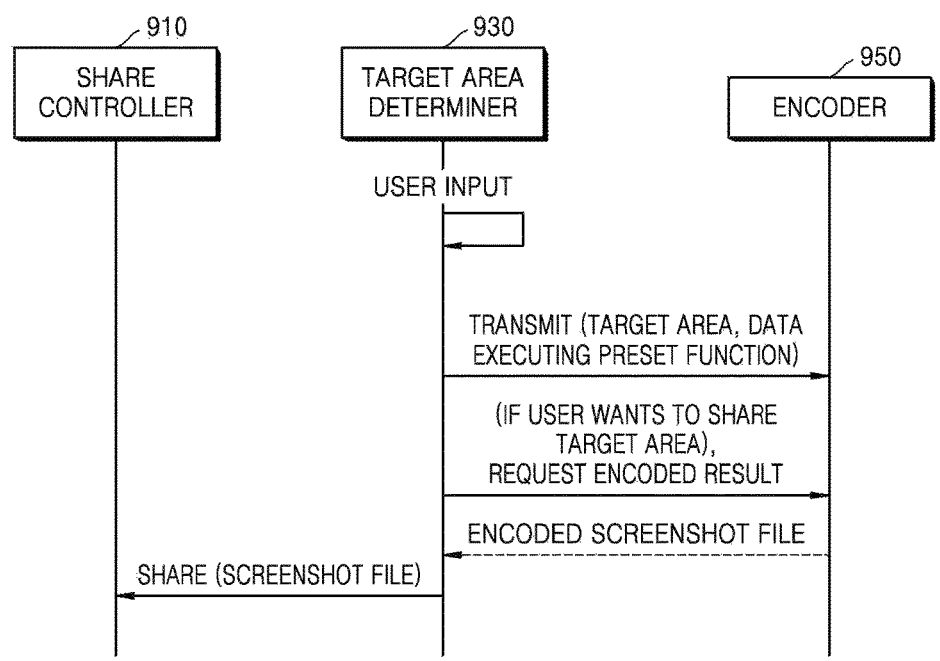
FIG. 9 is a schematic view of an information flow of a screenshot processing device based on a target area determiner, according to an exemplary embodiment of the present invention.

FIG. 9 is a schematic view of an information flow of a screenshot processing device based on a target area determiner, according to an exemplary embodiment of the present invention. A target area determiner 930 may identify a target area input by a user. The target area refers to an area that is selected as a target, where a preset function is to be hidden, from a whole area of the screenshot by the user.

Various types of touches may be performed on the displayed screenshot to perform an input of the target area.

If data executing the preset function to be hidden exists in the determined target area, the target area determiner 930 may transmit target area information and the data executing the preset function to an encoder 950.

If the user wants to share the target area with another user, the target area determiner 930 may request an encoded result from the encoder 950.

The encoder 950 may transmit an encoded screenshot file to the target area determiner 930.

The target area determiner 930 may transmit the screenshot file received from the encoder 950 to a share controller 910 to share the screenshot file.

Figure 10:
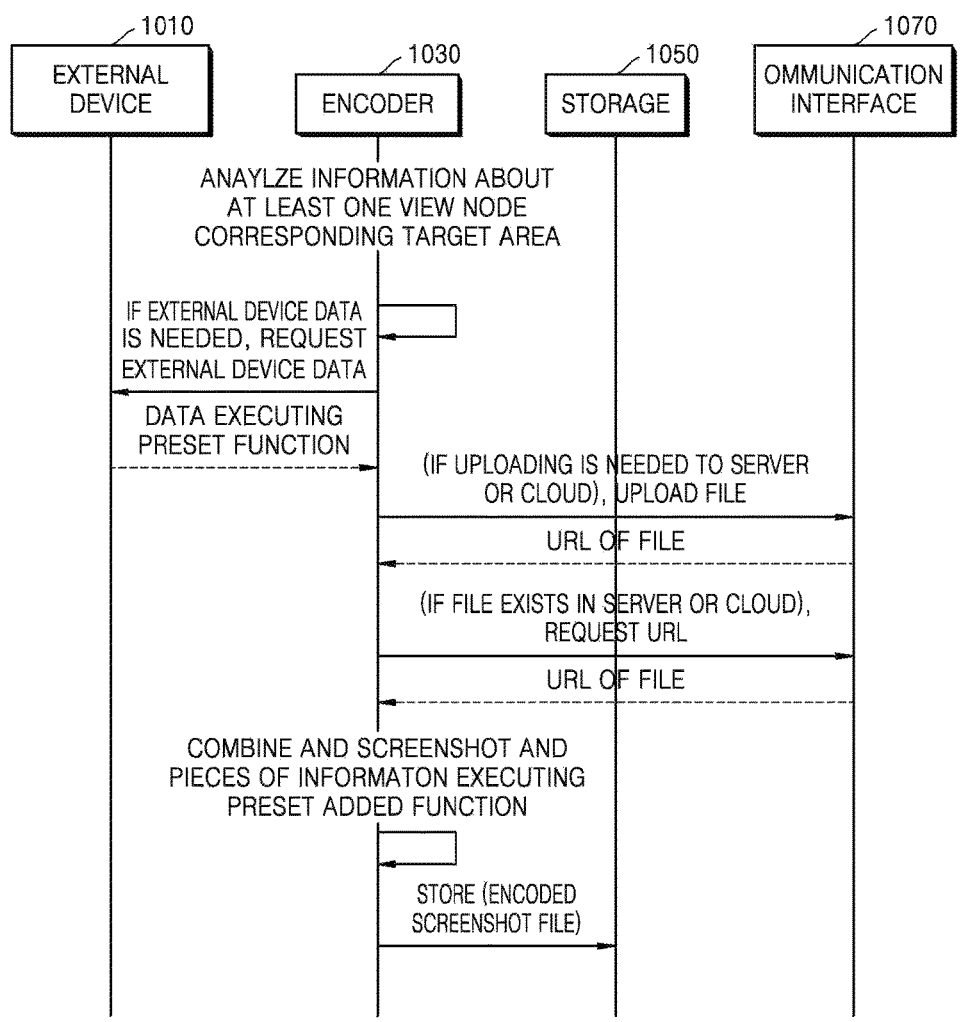
FIG. 10 is a schematic view of an information flow of a screenshot processing device based on an encoder, according to an exemplary embodiment of the present invention.

FIG. 10 is a schematic view of an information flow of a screenshot processing device based on an encoder, according to an exemplary embodiment of the present invention. An encoder 1030 may analyze information about at least one view node corresponding to a target area to which a preset function is to be added. If data of an external device 1010 is needed to execute a preset function, the encoder 1030 request of the external device 1010 for data.

The external device 1010 may respond to the request of the encoder 1030 to transmit data executing the preset function to the encoder 1030.

If the data executing the preset function is needed to be uploaded to a server or a cloud, the encoder 1030 may upload the data to the server or the cloud through a communication interface 1070.

If the uploading is completed, the communication interface 1070 transmits URL data of a place, to which the data executing the preset function is uploaded, to the encoder 1030.

Here, the encoder replaces data executing preset functions to be added with received URL data.

Also, if a file needed for encoding exists in an external server or cloud, the encoder 1030 may request URL data of a place, where a file exists, from the communication interface 1070.

The communication interface 1070 may transmit the URL data of the place, where the file needed for the encoder 1030 exists, to the encoder 1030.

Here, the encoder replaces data executing preset functions to be added with received URL data. The encoder 1030 integrates a screenshot with pieces of data executing preset functions to be added.

If a screenshot file is generated, the encoder 1030 may transmit the generated screenshot file to a storage 1050.

Figure 11:
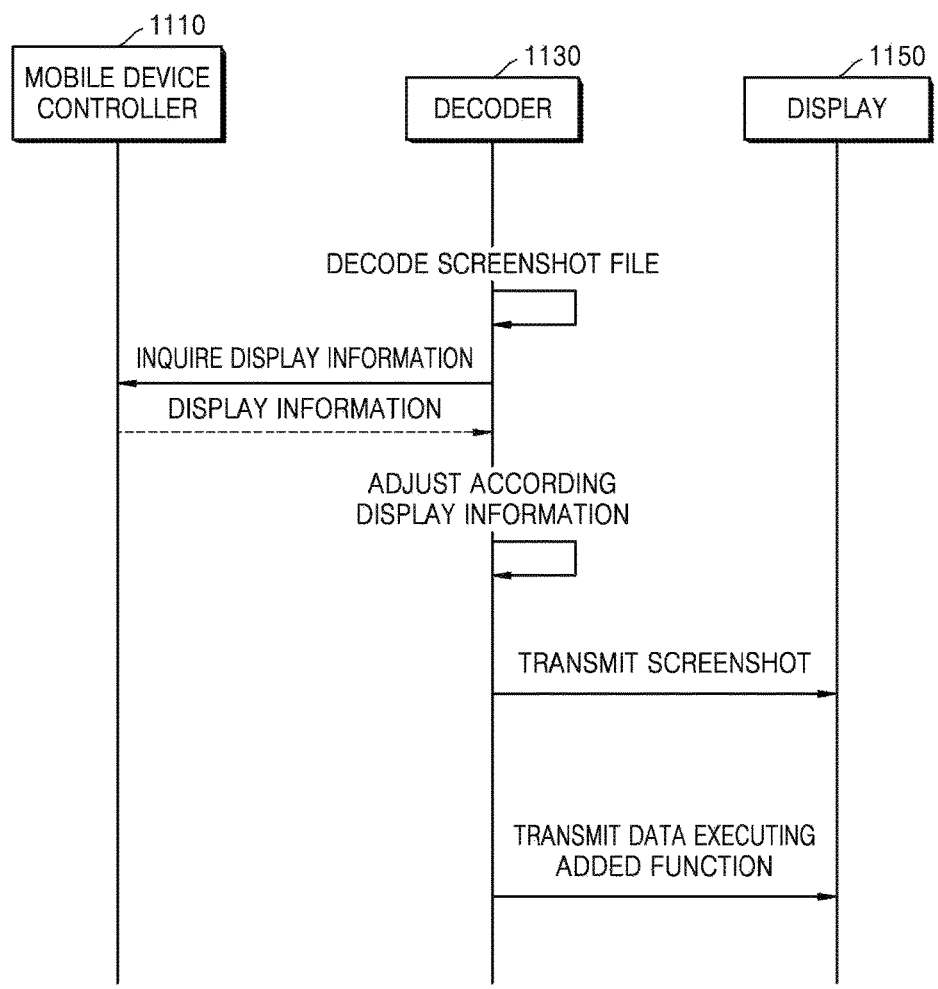
FIG. 11 is a schematic view of information flow of a screenshot processing device based on a decoder, according to an exemplary embodiment of the present invention.

FIG. 11 is a schematic view of an information flow of a screenshot processing device based on a decoder, according to an exemplary embodiment of the present invention. A decoder 1130 may decode a screenshot file.

The decoder 1130 may inquire of a mobile device controller 1110 about display information. The mobile device controller 1110 may transmit the display information to the decoder 1130.

The decoder 1130 may adjust the screenshot and data executing a preset function according to received display information. This adjustment may optimize the data for a display screen. The decoder 1130 may transmit the screenshot so as to enable a display 1150 to display the screenshot.

The decoder 1130 may provide data executing an added function so as to enable the display 1150 to execute a preset added function included in a screenshot file.

Figure 12:
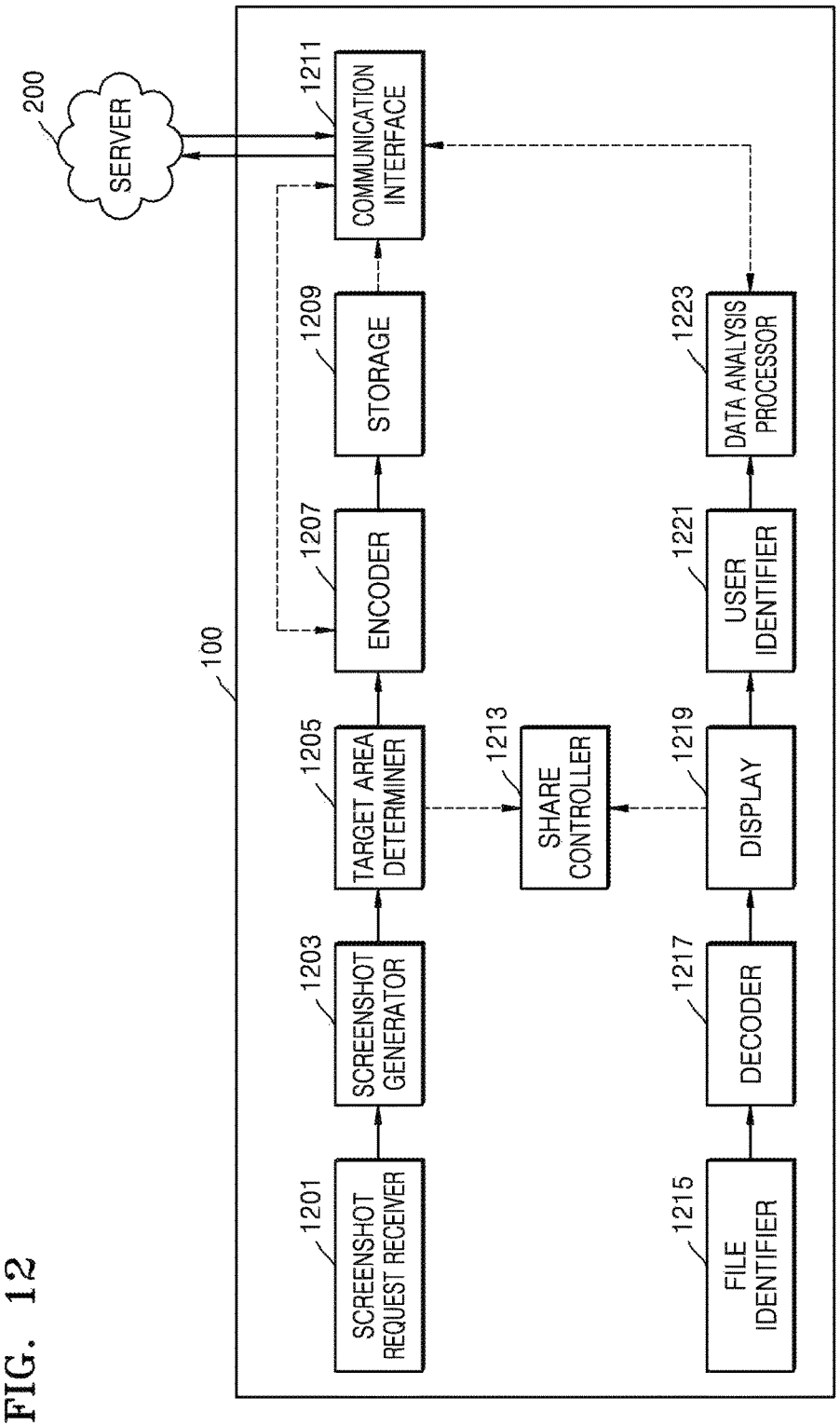
FIG. 12 is a flowchart illustrating connection relationships between elements of a device for processing a screenshot, according to an exemplary embodiment of the present invention.

FIG. 12 is a flowchart of connection relationships between elements of a screenshot processing device, according to an exemplary embodiment of the present invention.

According to example embodiments, the screenshot processing device 100 may be connected to a server 200 through a wire-wireless network. The connection to the external server 200 may be performed through a communication interface 1211.

The communication interface 1211 may be configured to perform wire and wireless communications with another mobile device or various types of servers 200. According to example embodiments, these communications may be limited according to users.

The communication interface 1211 may be configured to support a wireless communication protocol such as Bluetooth, Zigbee, WLAN, WiFi, home RF, UWB, or the like.

The screenshot processing device 100 may include a screenshot request receiver 1201, a screenshot generator 1203, a target area determiner 1205, an encoder 1207, a storage 1209, the communication interface 1211, a share controller 1213, a file identifier 1215, a decoder 1217, a display 1219, a user manipulation identifier 1221, and a data analysis processor 1223.

The screenshot request receiver 1201 may receive a screenshot request of a user. To make a request of the user, the user may sweep a screen of a mobile device with a palm, click a screenshot button on the screen, input a voice command for requesting a screenshot, or recognize light irradiated from a light sensor of the screenshot processing device 100.

If the screenshot request is received, the screenshot generator 1203 generates a view tree file on a displayed window screen and performs screen capturing. The view tree file may store information about each view node.

If the screenshot is generated, the target area determiner 1205 may receive a user input to determine a target area to which a preset function is to be added.

The encoder 1207 may combine the screenshot with data executing the preset function to generate the screenshot file.

The generated screenshot file may be shared with another user through the share controller 1213.

The generated screenshot file may be stored in the storage 1209.

The screenshot file generated by the encoder 1207 or a screenshot file stored in the storage 1209 may be uploaded to an external server 200 through the communication interface 211.

The file identifier 1215 may identify the screenshot file and identify an area where a preset function is hidden from a whole area of the screenshot. Also, according to example embodiments, the file identifier 1215 may identify an area selected by the user from a whole area of a displayed screenshot.

The decoder 1217 may decode the screenshot combined with the screenshot file and pieces of data executing an added function.

When the user opens the screenshot file, the display 1219 may display the screenshot in an optimized shape in a display device. Here, the area where the preset function is hidden among the whole area of the screenshot may be highlighted and displayed.

According to example embodiments, the area of the whole area of the screenshot where the preset function is hidden may be displayed in a semi-transparent box added in a figure such as a square, a circle, an ellipse, or the like.

Also, the display 1219 may display a preset function added to an area of the screenshot.

According to example embodiments, the user manipulation identifier 1221 may identify a manipulation of the user for an executed function.

For example, if the executed function is a function of executing a text editor to edit a text included in the screenshot, the user manipulation identifier 1221 may identify contents edited by the user.

The data analysis processor 1223 may analyze statics, etc. about an execution of a function added to the screenshot file.

The statics about the execution of the function added to the screenshot file may include execution frequencies of functions added to the screenshot and statics about execution forms.

A result analyzed through the data analysis processor 1223 may be stored in and shared by the external server 200 through the communication interface 1211.

Figure 13:
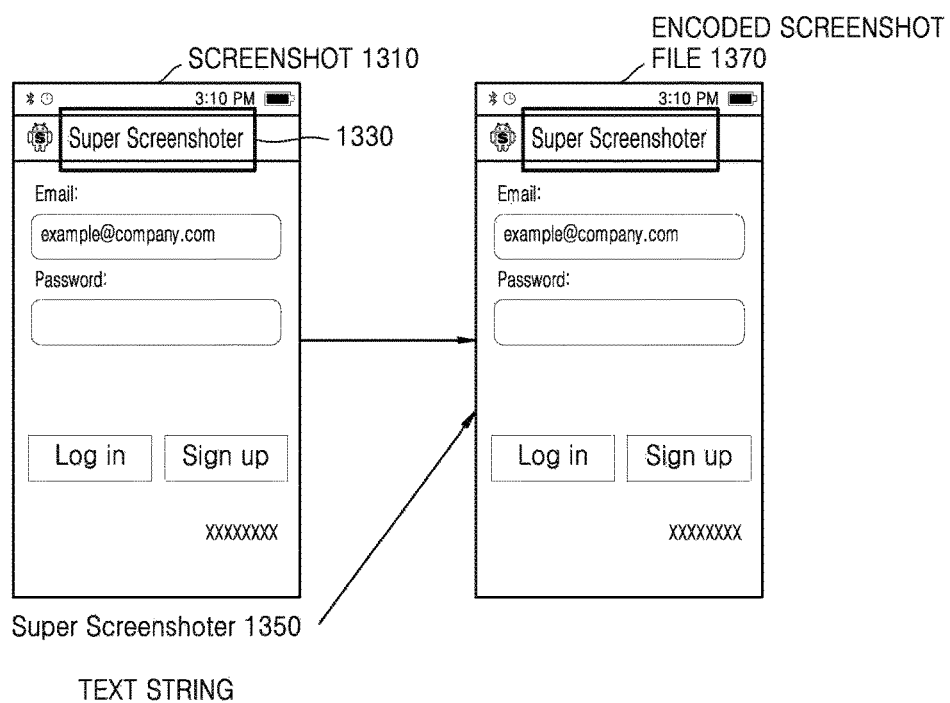
FIG. 13 illustrates a combination of a screenshot and a text to generate one screenshot file, according to an exemplary embodiment of the present invention.

FIG. 13 illustrates a combination of a screenshot and a text to generate a screenshot file, according to an exemplary embodiment of the present invention.

If a screenshot 1310 and a text string 1350 are combined and encoded, an encoded screenshot file 1370 may be generated. Here, a function of providing the text string 1350 may be executed by using an area 1330 including a text among a whole area 1310 of the screenshot as a target area.

According to example embodiments, all of areas expressed with texts among the whole area 1310 of the screenshot may be determined, and each text string may be encoded with the screenshot.

Figure 14:
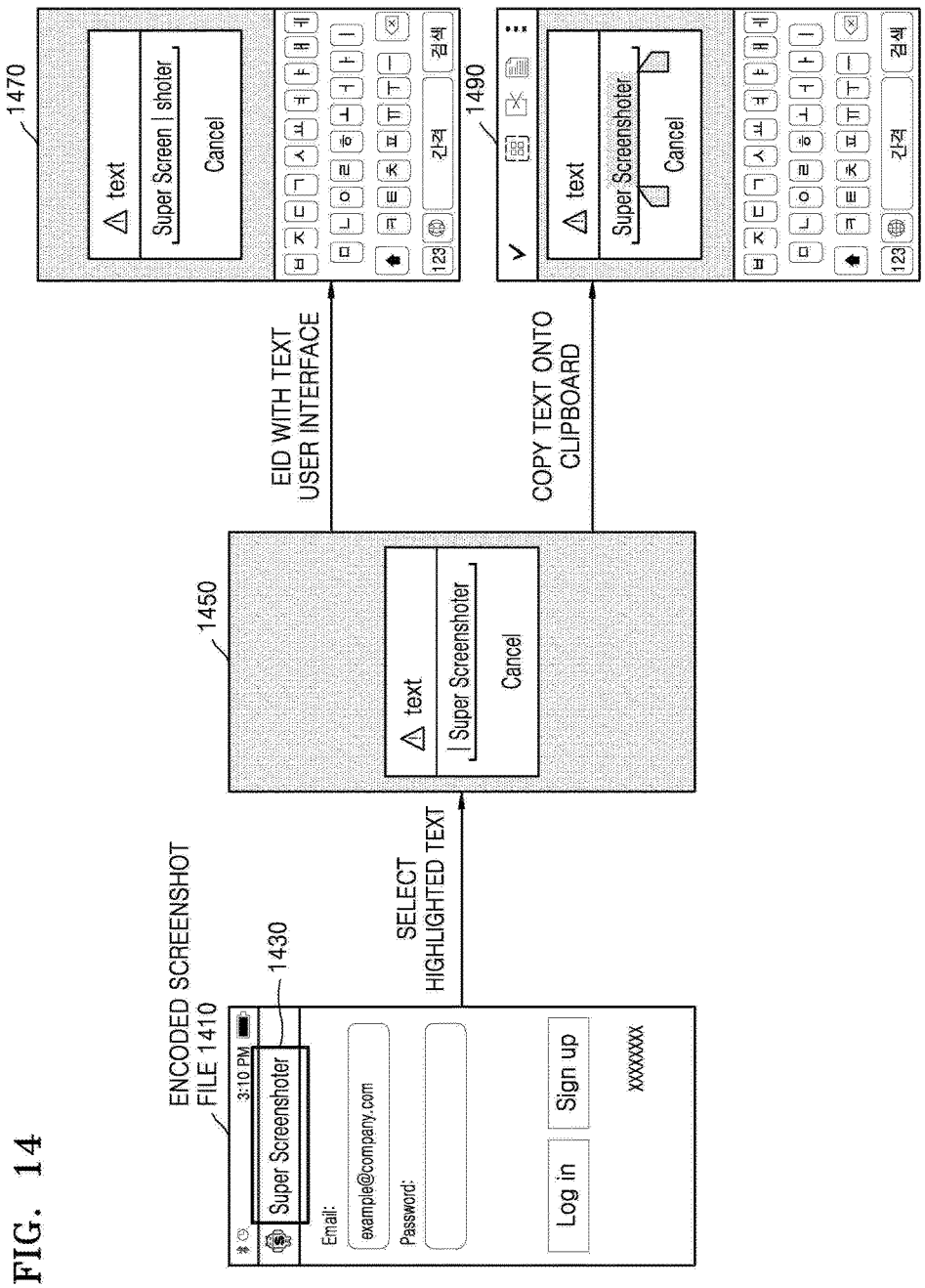
FIG. 14 illustrates execution of a screenshot file according to an exemplary embodiment of the present invention.

FIG. 14 illustrates an execution of a generated screenshot file, according to an exemplary embodiment of the present invention.

According to example embodiments, an encoded screenshot file 1410 may be displayed on a display.

According to example embodiments, a target area 1430 that hides a preset function may be highlighted and displayed.

If a user selects a highlighted part, the preset function hidden in the target area 1430 may be executed (1450).

A screenshot and added functions displayed on a display may be shared by other users through the share controller 1213.

According to example embodiments, a preset function may be a function of editing a corresponding text by using a text user interface (1470).

According to other example embodiments, a preset function may be a function of selecting all or some of a text and copying the selected all or some of the text onto a clipboard (1490).

Figure 15:
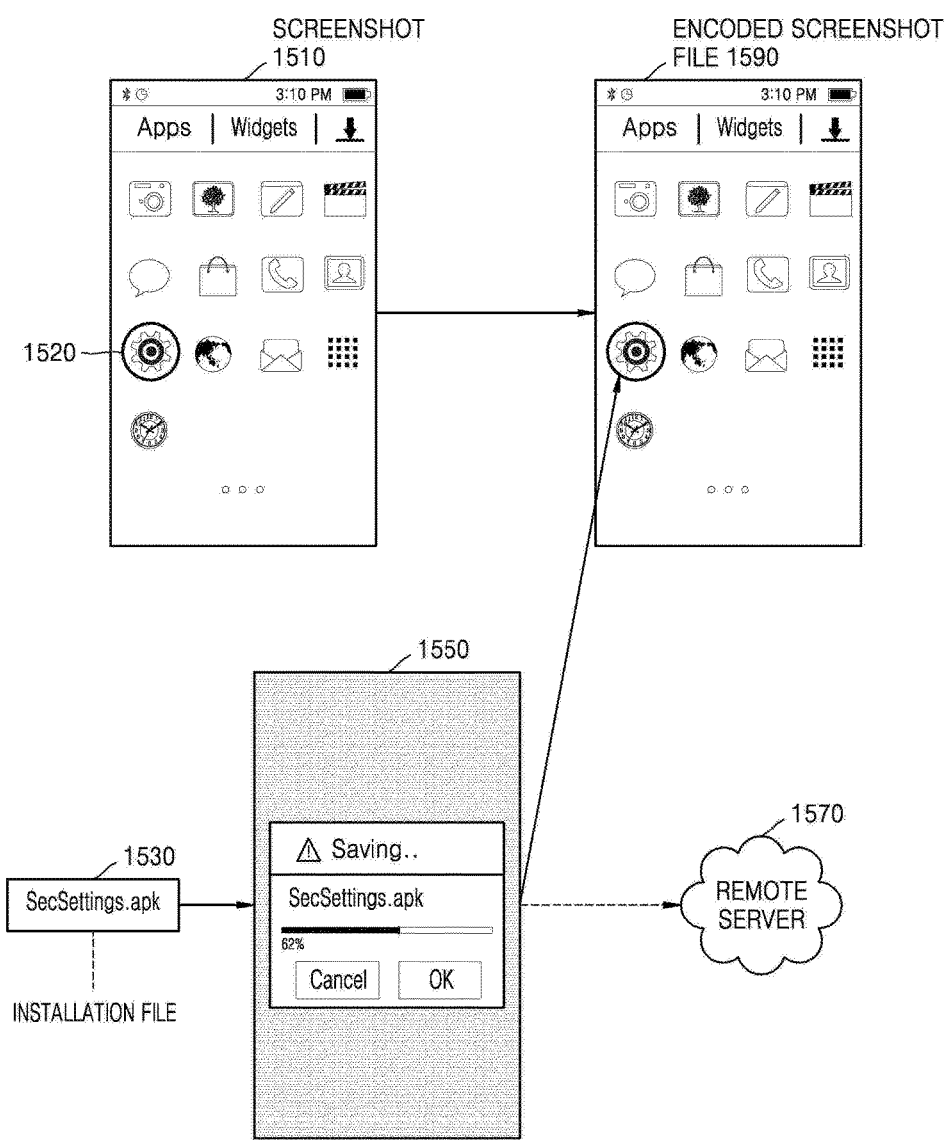
FIG. 15 illustrates a combination of a screenshot and an application installation file to generate one screenshot file, according to an exemplary embodiment of the present invention.

FIG. 15 illustrates a combination of a screenshot and an application installation file to generate one screenshot file, according to an exemplary embodiment of the present invention.

According to example embodiments, if a screenshot 1510 and an installation file 1530 may be combined and encoded, a screenshot file 1590 may be generated.

Here, a function of executing the installation file 1530 may be executed by using an area 1520 including an application for installing an application among a whole area 1510 of the screenshot as a target area.

According to example embodiments, the installation file 1530 may be stored in a remote server 1570. Here, the screenshot processing device 100 may receive URL data of a place, where the installation file 1530 is stored, from the remote server 1570 and combine the received URL data with the screenshot 1510 to generate the screenshot file 1590.

According to example embodiments, an installation file may include an Android PacKage (APK) program file.

Figure 16:
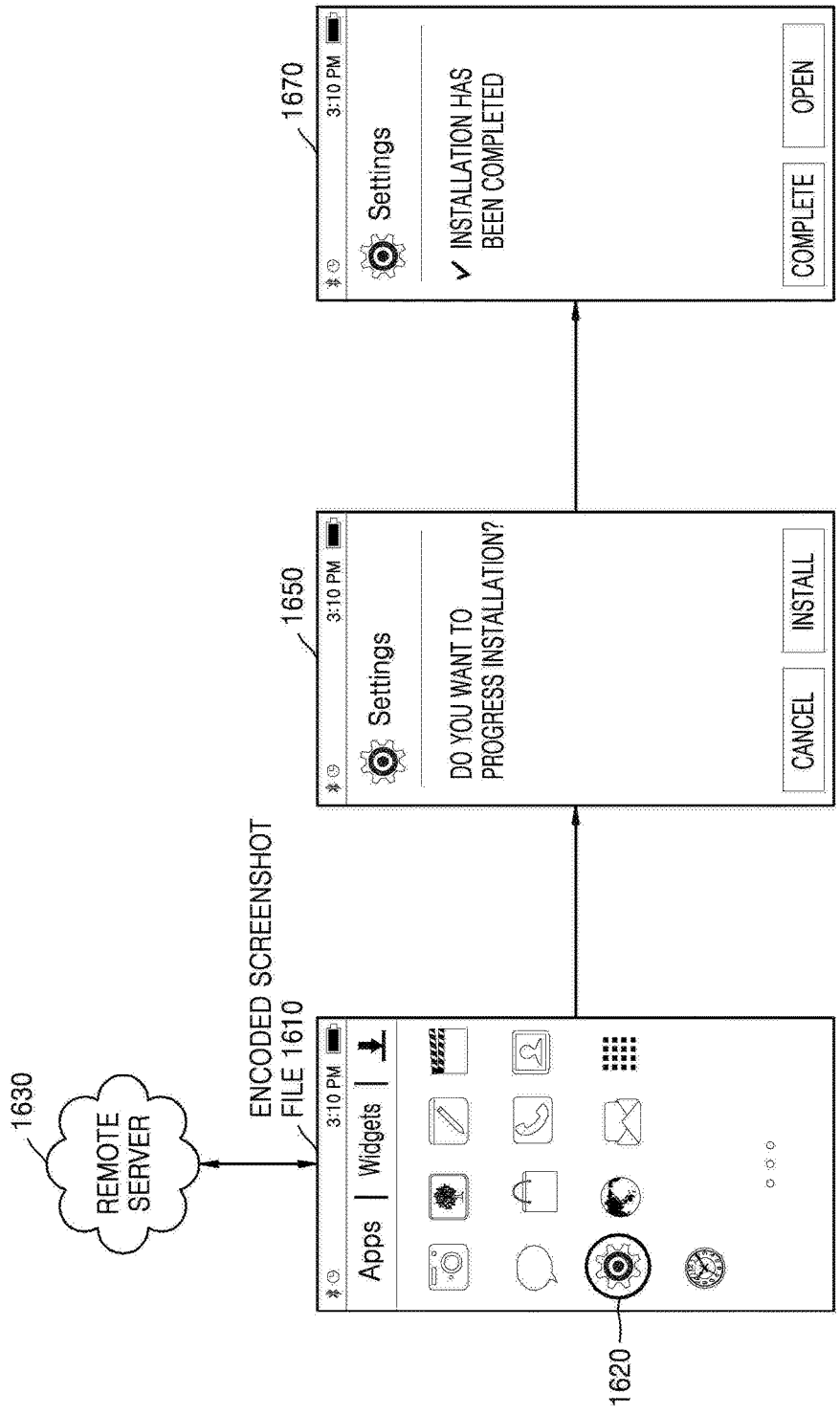
FIG. 16 illustrates execution of a generated screenshot file according to an exemplary embodiment of the present invention.

FIG. 16 illustrates an execution of a generated screenshot file according to an exemplary embodiment of the present invention.

According to example embodiments, an encoded screenshot file 1610 may be displayed on a display.

According to example embodiments, a target area 1620 that hides a preset function may be highlighted and displayed.

If a user selects a highlighted part, the preset function hidden in the target area 1620 may be executed.

According to example embodiments, a preset function may be a function of receiving an installation or an uninstallation of an application or a file (1650) to install the application or the file (1670).

According to example embodiments, to execute this function, the screenshot processing device 100 may access a stored URL to receive a corresponding installation file from the remote server 1630 when the target area 1620 is selected and encoded.

Figure 17:
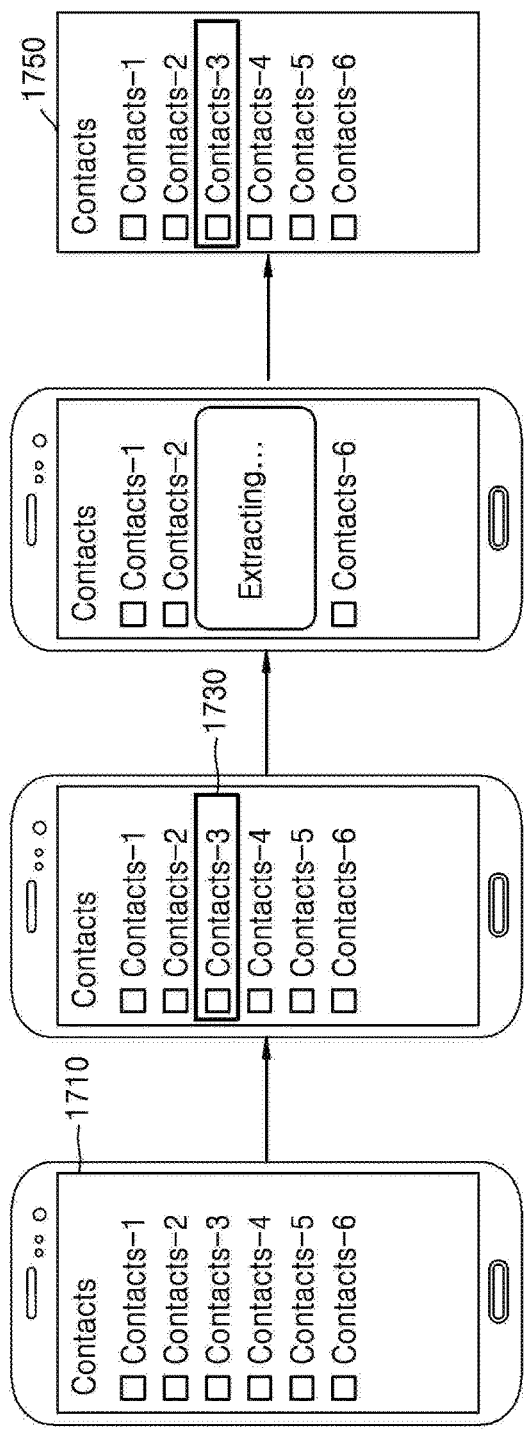
FIG. 17 illustrates selection of a target area from a screenshot and extraction of data for executing an added function in the selected target area, according to an exemplary embodiment of the present invention.

FIG. 17 illustrates a selection of a target area from a screenshot and an extraction of data executing an added function in the selected target area, according to an exemplary embodiment of the present invention.

According to example embodiments, if an area 1730 including some contacts is determined as a target area from a screenshot 1710 capturing a contact list, the screenshot processing device 100 may extract information such as a name, a phone number, an e-mail address, etc. included in the target area 1730 to generate a card file and combine the generated card file with the screenshot 1710 to generate an encoded screenshot file 1750.

Figure 18:
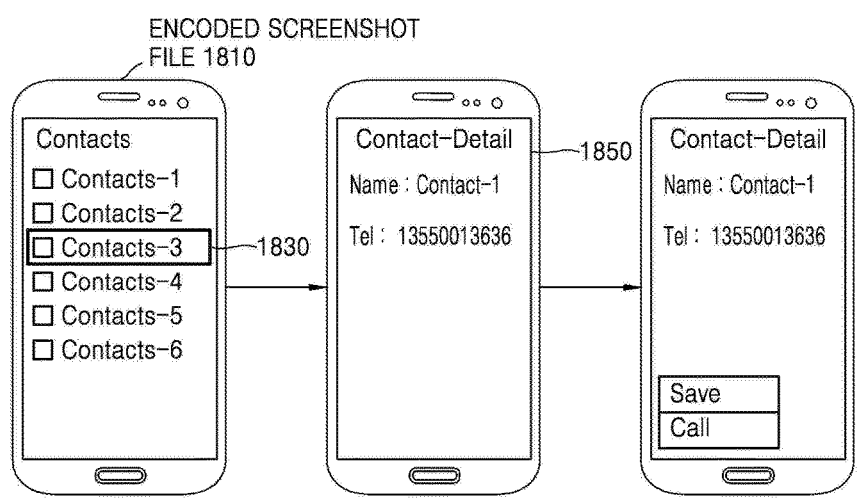
FIG. 18 illustrates execution of a generated screenshot file according to an exemplary embodiment of the present invention.

FIG. 18 illustrates an execution of a generated screenshot file according to an exemplary embodiment of the present invention.

According to example embodiments, an encoded screenshot file 1810 may be displayed on a display.

According to example embodiments, a target area 1830 that hides a preset function may be highlighted and displayed.

If a user selects a highlighted part, the preset function hidden in the target area 1830 may be executed.

According to example embodiments, a preset function may be a function of displaying a card file 1850 of a contact included in the target area 1830. According to example embodiments, the displayed card file may be stored in a contact application.

Figure 19:
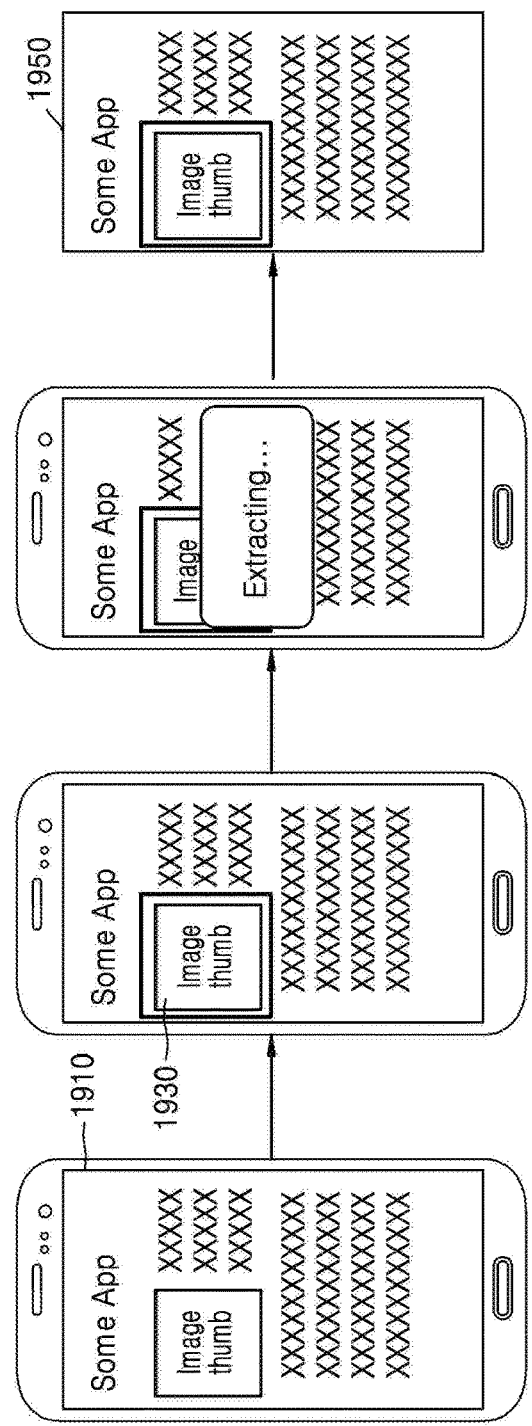
FIG. 19 illustrates selection a target area from a screenshot and extraction of data for executing an added function in the selected target area, according to an exemplary embodiment of the present invention.

FIG. 19 illustrates a selection of a target area from a screenshot and an extraction of data executing an added function from the selected target area, according to an exemplary embodiment of the present invention.

According to example embodiments, if an area 1930 including a thumbnail image is determined as a target area from a screenshot 1910 including a thumbnail image, the screenshot processing device 100 may extract an original image of the thumbnail image included in the target area 1930 and combine the extracted original image file and the screenshot 1910 to generate a screenshot file 1950.

Figure 20:
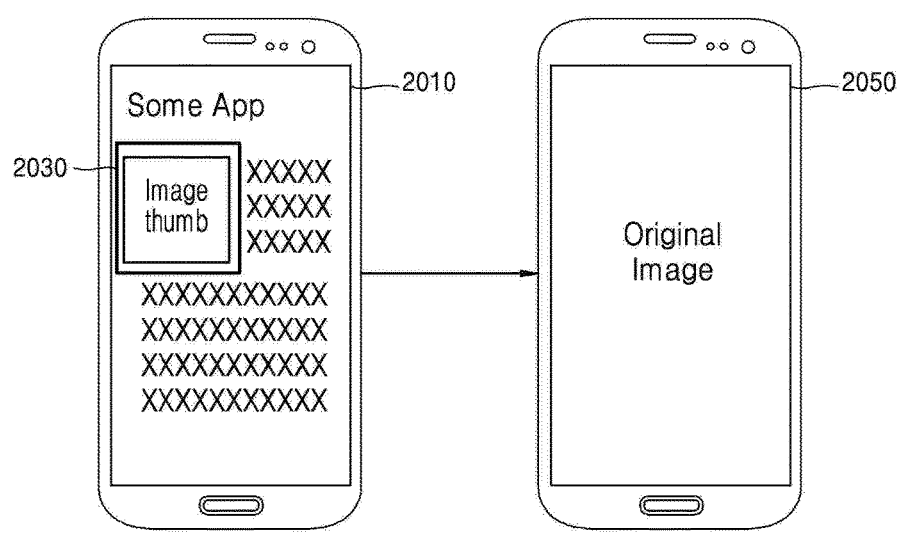
FIG. 20 illustrates execution of a generated screenshot file according to an exemplary embodiment of the present invention.

FIG. 20 illustrates an execution of a generated screenshot file according to an exemplary embodiment of the present invention.

According to example embodiments, an encoded screenshot file 2010 may be displayed on a display.

According to example embodiments, a target area 2030 that hides a preset function may be highlighted and displayed.

If a user selects a highlighted part, the preset function hidden in the target area 2030 may be executed.

According to example embodiments, a preset function may be a function of displaying an original image 2050 of a thumbnail image included in the target area 2030.

Figure 21:
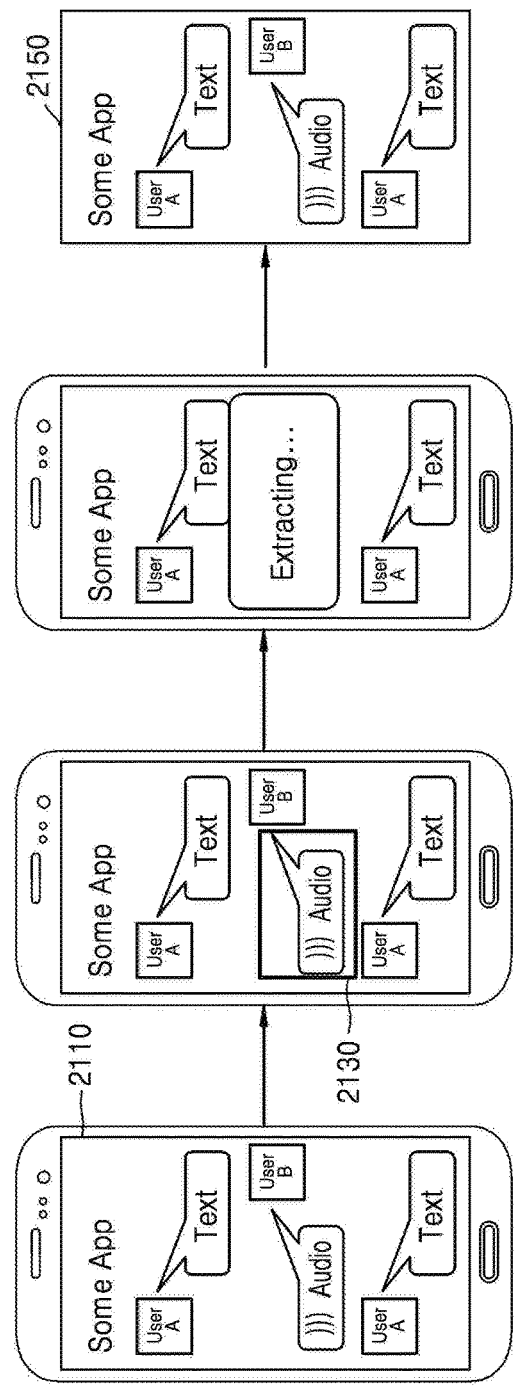
FIG. 21 illustrates selection of a target area from a screenshot and extraction of data for executing an added function in the selected target area, according to an exemplary embodiment of the present invention.

FIG. 21 illustrates a selection of a target area from a screenshot and an extraction of data executing an added function from the selected target area, according to an exemplary embodiment of the present invention.

If an application through which conversations may be made with another user is executed to generate a screenshot 2110 including conversation contents, and an area 2130 including some conversation contents is determined as a target area, the screenshot processing device 100 may extract an audio file included in the target area 2130 and combine the extracted audio file and the screenshot 2110 to generate a screenshot file 2150.

The target area 2130 may include various types of multimedia files such as a video file, an image file, etc.

Figure 22:
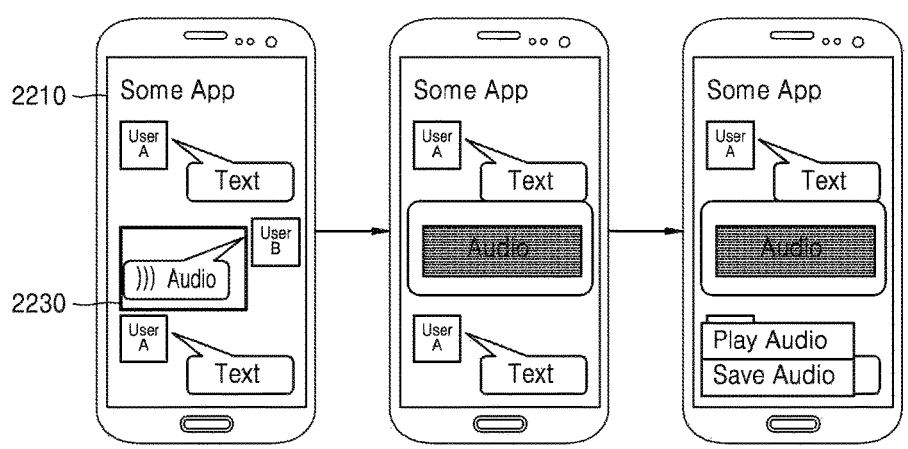
FIG. 22 illustrates execution of a generated screenshot file according to an exemplary embodiment of the present invention.

FIG. 22 illustrates an execution of a generated screenshot file according to an exemplary embodiment of the present invention.

According to example embodiments, an encoded screenshot file 2210 may be displayed on a display.

According to example embodiments, a target area 2230 that hides a preset function may be highlighted and displayed.

If a user selects a highlighted part, the preset function hidden in the target area 2230 may be executed.

According to example embodiments, a preset function may be a function of playing an audio file included in the target area 2230.

According to example embodiments, a played audio file may be stored.

According to an exemplary embodiment of the present invention, if data executing a preset alarm function is encoded on a screenshot capturing a calendar screen to generate a screenshot file, and a particular date area is selected on the displayed screenshot, a preset alarm function for the selected data may be executed.

While the present invention has been particularly shown and described with reference to example embodiments thereof, it will be understood by those skilled in the art that various changes in form and details may be made therein without departing from the spirit and scope of the invention as defined by the appended claims. The example embodiments may be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A screenshot processing method comprising:
generating a screenshot of a displayed screen;
determining at least one target area including an object, from a whole area of the generated screenshot;
combining data for executing a preset function comprising an interactive control which can be manipulated by a user corresponding to the object, with the at least one target area that is included in the generated screenshot;
generating a screenshot file comprising the data for executing the preset function combined with the at least one target area that is included in the generated screenshot;
displaying the generated screenshot file;
identifying an area selected by the user from a whole area of the displayed screenshot file;
decoding a preset function combined to the area selected by the user that is included in the displayed screenshot file; and
executing the preset function combined to the area selected by the user.

2. The screenshot processing method of claim 1, wherein the generating of the screenshot comprises:

storing at least one view node configuring the displayed screen and information about the at least one view node; and capturing the displayed screen.

3. The screenshot processing method of claim 2, wherein the information about the at least one view node comprises at least one selected from an ID (Identification), a name, coordinates, and a size of the at least one view node.

4. The screenshot processing method of claim 1, wherein the at least one target area is manually determined through a user input or is automatically determined through a preset format.

5. The screenshot processing method of claim 1, wherein the data for executing the preset function is acquired from an external device or a local device.

6. The screenshot processing method of claim 1, wherein the data for executing the preset function is replaced with URL (uniform resource locator) data of an external device that stores the data for executing the preset function.

7. The screenshot processing method of claim 1, further comprising:

sharing the screenshot file with an external device.

8. The screenshot processing method of claim 1, wherein the decoding of the screenshot file comprises:

acquiring display information of a device where the preset function combined to the area selected by the user is to be executed; and adjusting the screenshot and the data for executing the preset function combined to the area selected by the user based on the acquired display information.

9. The screenshot processing method of claim 1, wherein the decoding of the screenshot file comprises acquiring information stored in an external device based on the data for executing the preset function combined to the area selected by the user, wherein the data for executing the preset function combined to the area selected by the user is data replaced with URL data of the external device, and the preset function combined to the area selected by the user is executed by using the information stored in the external device.

10. A screenshot processing device comprising:

a user interface which receives a screenshot request;

a processor which generates a screenshot of a displayed screen, determines at least one target area including an object, from a whole area of the generated screenshot, combines data for executing a preset function comprising an interactive control which can be manipulated by a user corresponding to the object with the at least one target area that is included in the generated screenshot, and generates a screenshot file comprising the data for executing the preset function combined with the at least one target area that is included in the generated screenshot; and a display which displays the generated screenshot file, wherein the processor identifies an area selected by the user from a whole area of the displayed screenshot file, decodes a preset function combined to the area selected by the user that is included in the displayed screenshot file, and executes the preset function combined to the area selected by the user, and wherein at least one of the user interface and the processor is configured as hardware.

11. The screenshot processing device of claim 10, wherein the processor stores at least one view node configuring the displayed screen and information about the at least one view node and captures the displayed screen.

12. The screenshot processing device of claim 11, wherein the information about the at least one view node comprises at least one selected from information about an ID (Identification), a name, coordinates, and sizes of the at least one view node.

13. The screenshot processing device of claim 10, wherein the processor manually determines the at least one target area through a user input or automatically determines the at least one target area through a preset format.

14. The screenshot processing device of claim 10, wherein the data for executing the preset function is acquired from an external device or a local device.

15. The screenshot processing device of claim 10, wherein the data for executing the preset function is replaced with URL (uniform resource locator) data of an external device storing the data for executing the preset function.

16. The screenshot processing device of claim 10, wherein the processor shares the screenshot with an external device.

17. The screenshot processing device of claim 10, wherein the processor acquires display information to adjust the screenshot and the data for executing the preset function combined to the area selected by the user based on the acquired display information.

18. The screenshot processing device of claim 10, wherein the processor acquires information stored in an external device based on the data for executing the preset function combined to the area selected by the user, wherein the data for executing the preset function combined to the area selected by the user is data replaced with URL (uniform resource locator) data of the external device, and the preset function combined to the area selected by the user is executed by using the information stored in the external device.

* * * * *